Jan. 15, 1963
J. D. McCUNE
3,073,688
METHOD FOR CLEANING PIPELINES
Filed Nov. 10, 1961
2 Sheets-Sheet 1
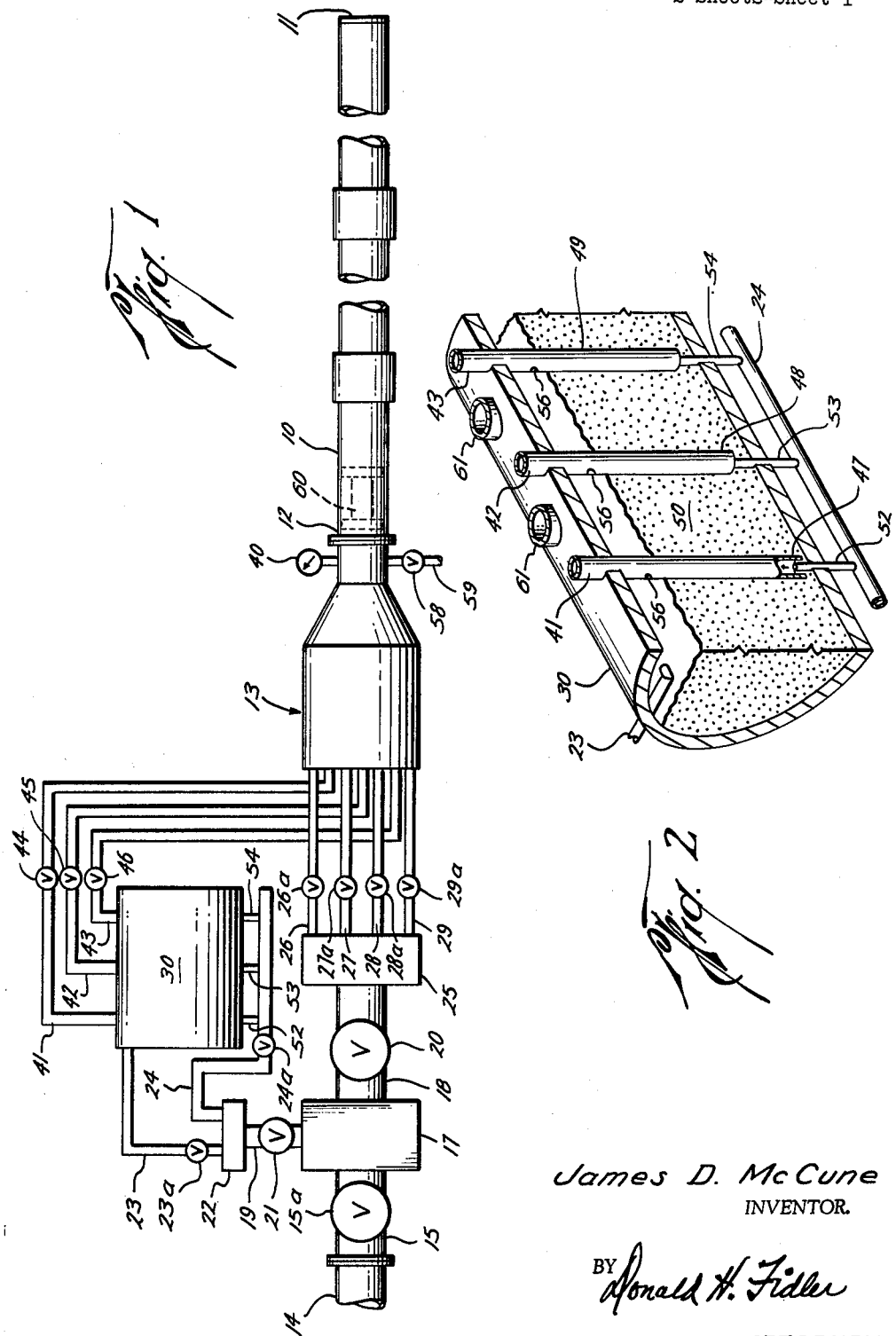
James D. McCune
INVENTOR.
BY Donald H. Fidler
ATTORNEY

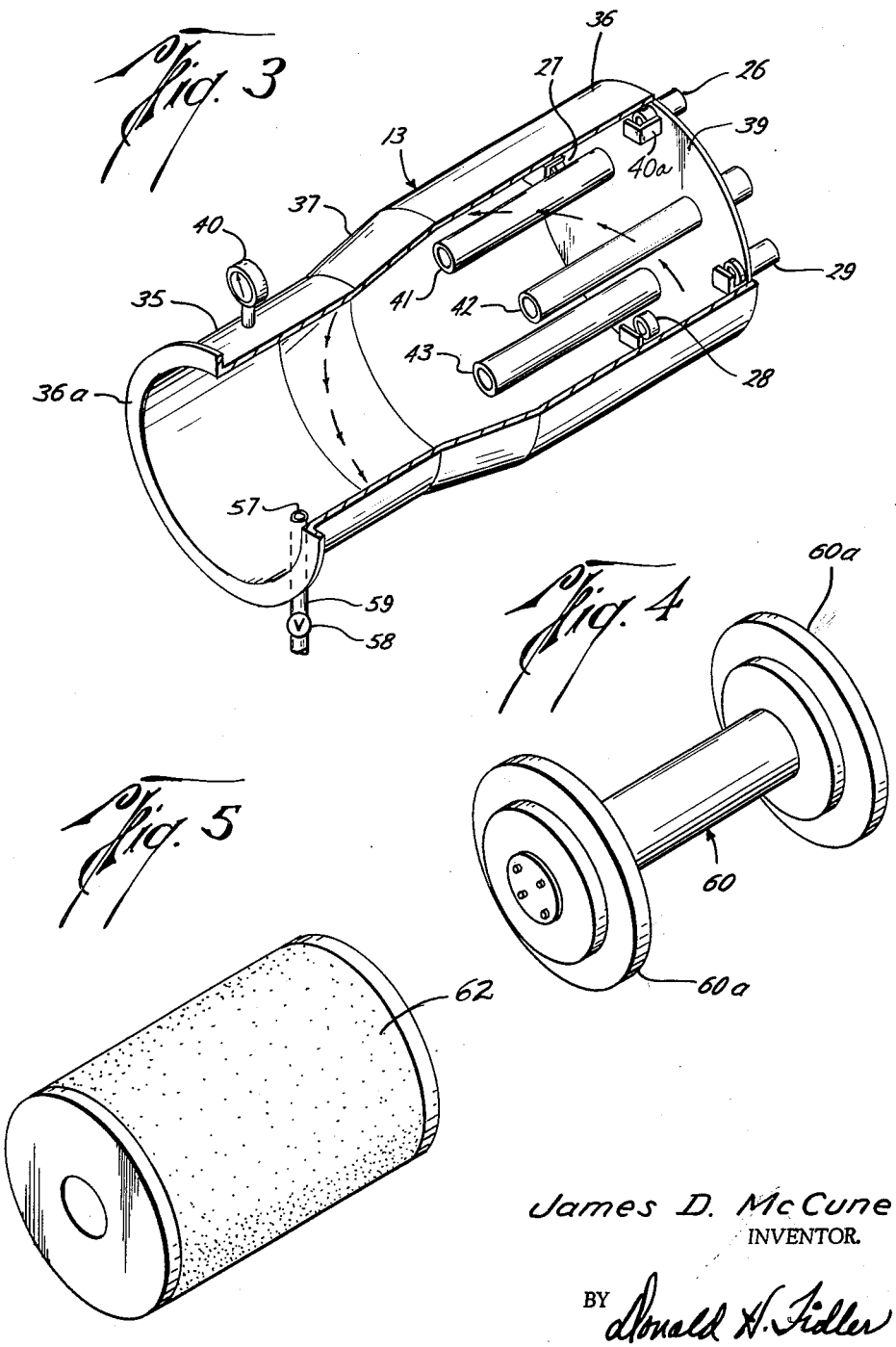

United States Patent Office 3,073,688
Patented Jan. 15, 1963

3,073,688
METHOD FOR CLEANING PIPELINES
James D. McCune, La Porte, Tex., assignor to Klean-Kote Incorporated, La Porte, Tex., a corporation of Texas
Filed Nov. 10, 1961, Ser. No. 151,503
1 Claim. (Cl. 51—317)

This invention relates to methods and apparatus for use in the cleaning of gas pipelines in which a gas drive is employed. In particular, this invention relates to the cleaning of natural gas pipeline systems and expurgating air from the apparatus to avoid introduction of a mixture of air into a pipelne.

In the sandblastng of natural gas pipelines where natural gas is used in the cleaning process, it is necessary to avoid a mixing of air and natural gas since such a mixture is combustible. In the sandcleaning of natural gas pipelines, a length of several miles, say about ten, is usually selected for cleaning. The section or length of line to be cleaned is typically opened to the atmosphere at its outlet end while apparatus is provided at the inlet end to introduce into the pipeline a mixture of natural gas and sand for purposes of cleaning the length of the line. Preliminarily to the sandblasting of the pipeline, however, it is desirable to pass a pipeline pig through the pipeline to expel any debris, accumulations, etc. It is also extremely desirable to prevent any mixture of air from being formed with the natural gas used to propel the pig through the pipeline prior to sandblasting.

The apparatus in accordance with the present invention includes an injection nozzle which is coupled between the inlet end of a section of pipeline to be cleaned and the gas supply means. A selectively opened bypass outlet is located near the coupling of the nozzle to the inlet end of the pipeline. The bypass outlet permits a low pressure expulsion of air from the sandblasting apparatus without dislodging a pig positioned in the inlet end of the pipeline.

In accordance with the methods of the present invention, after a pig is inserted into a pipeline at its inlet end thereof and an injection nozzle is coupled between the inlet end of the pipeline and gas supply means, the injection nozzle is opened to the atmosphere and low pressure gas flow is supplied through the sandblasting apparatus to expel air via the opening to the atmosphere without dislodging the pig from the inlet of the pipeline. After the air is completely expelled, the opening in the nozzle is closed and high pressure gas flow is provided to drive the pig through the pipeline.

Accordingly, it is an object of the present invention to provide new and improved methods for safe cleaning of gas flow lines.

Another object of the present invention is to provide a new and improved apparatus for purging air prior to the introduction of gas to a pipeline.

Other objects, advantages and features of the invention will become apparent to one skilled in the art upon studying the specification and claim as well as the drawings wherein:

FIG. 1 is a view of a pipeline and apparatus embodying the present invention and used with the method of the present invention;

FIG. 2 is a partial view in cross-section of apparatus used with the present invention;

FIG. 3 is a perspective and partially sectional view of apparatus embodying the present invention and used with the method of the present invention; and FIGS. 4 and 5 are perspective views of apparatus used with the present invention.

Referring now to FIG. 1, an isolated section of natural gas pipeline 10 comprised of a number of coupled lengths of pipes is illustrated. Pipeline 10 has an outlet end 11 open to the atmosphere and an inlet end 12. A sand blast nozzle or head 13 is releasably connected to the inlet end 12 in a manner which will hereinafter become more apparent. The end 14 of the pipeline from which the section 10 is isolated, is shown to the left of the inlet end 12 of section 10 and constitutes a source or supply of natural gas with sufficient quantities and pressures for the operation of the method of the present invention. While a natural gas pipeline is herein described, it will be appreciated that other types of gas pipelines are susceptible to the practice of the invention herein disclosed.

For the purpose of controlling a flow of gas from the end 14 of the pipeline, the end 14 is coupled by an extension 15 to a manifold 17. A main valve 15a is inserted in the extension 15 to provide a control of the gas supply to the manifold 17. Manifold 17 in turn is provided with outlets 18 and 19 respectively having control valves 20 and 21 to control the flow of gas through the respective outlets. Outlet 19 from the manifold 17 is coupled to another manifold 22 which has outlets 23 and 24 being connected to the sand supplying pot 30. Control valves 23a and 24a may be provided in the outlets 23 and 24 respectively. Outlet 18 from manifold 17 is connected with another manifold 25 which has outlets 26–29 connected to nozzle 13 and respectively having control valves 26a–29a. Sand supply pot 30 has mixture feed pipes 41–43 coupled to the nozzle 13, the feed pipes respectively having valves 44–46.

Referring now to FIG. 3, the nozzle 13 is comprised of a front end portion 35 adapted for coupling with a pipeline and having an internal diameter similar to the diameter of the pipeline to be cleaned. Front end portion 35 may, for example, include a flanged end 36a suitably arranged for a quick connect and disconnect coupling to the end of the pipeline. The front end portion 35 of the head 13 is joined by a frusto-conical section 37 to a rearward end portion 36 having a relatively larger diameter than the front end portion 35. The gas outlet pipes 26–29 from the manifold 25 are received in a rear plate 39 of the nozzle 13 with their centers disposed upon a circle having a diameter substantially equal to that of the diameter of the pipe to be cleaned, the centers being equiangularly disposed about the circle. Baffles or deflectors 40a are mounted within the nozzle 13 and disposed over the respective open ends of the gas outlet pipes 26–29 to deflect the gas circumferentially around the head so that the gas effectively travels in a spiral path within the rearward portion (shown by the arrows) and is contracted as it is passed by the frusto-conical section 37 into the front end portion 35. Mixture inlet pipes 41–43 from the sand-supplying pot 30 are inserted through the rear plate 39 of the nozzle 13 and are generally equiangularly spaced about a circle which has a diameter substantially less than the diameter of the pipeline to be cleaned. The pipes 41–43 generally lie within the periphery of an imaginary cylinder extended rearwardly from the inner wall of the forward end section 35. The open ends of the mixture pipes 41–43 are spaced slightly to the rear of the frusto-conical section 37 so that the sand and gas mixture exiting from the pipes 41–43 is picked up by the swirling gas and compressed in the frusto-conical section 37 for introduction to the inlet end of the pipeline. A pressure gauge 40 is connected to the forward end 35 of the head 13. In accordance with the present invention an outlet 57 is located near the flanged end 36a of the nozzle 13. The outlet 57 is therefore in close proximity to the inlet end of the pipeline section 10. Outlet 57 is selectively opened or closed relative to the atmosphere by means of a pipe 59 and selectively operable control valve 58. While a valve 58 is shown, it will be readily appreciated that any type of closure means which can open and close outlet 57 will be suitable for the purposes of the present invention.

The sand-supply pot 30 (FIG. 2) includes the sand and gas mixture pipes 41–43 which respectively contain valves 44–46 and include pipe sections 47–49 which extend from an upper or top portion of the pot downwardly to a point just below the bottom or lower portion of the pot. The pot 30 is generally a cylindrically-shaped, closed vessel which contains normally closed access ports 61 which are used to permit the loading of the pot with sand. Gas feed pipes or jets 52–54 are arranged and respectively aligned with the open, lower ends of the pipe sections 47–49 and are coupled to the gas outlet 24. The open end of jet pipes 52–54 are substantially aligned with the open ends of pipes 47–49 on a common horizontal plane. Hence, gas introduced through pipe 24 and jets 52–54 may drive sand in the container upwardly through the respective pipe sections 47–49. To provide a mixing and boosting action, the pipe sections 47–49, near their upper ends, are provided with the openings 56 and the gas outlet 23 is arranged to enter the pot and introduce gas into the upper portion of the pot above the sand level. Hence, gas under pressure enters through the openings 56 in the pipe sections 47–49 to further lean out the mixture of sand and gas through the pipe sections and carry the sand to the nozzle 13.

The method and apparatus of the present invention will be more fully understood from the following description of the system. The pipeline 10 is cleared preliminarily by a purge of gas through the line while the outlet end 11 is open to the atmosphere. This may be done, for example, by connecting up the head 13 and preliminarily opening the valves 26a–29a. Control valve 20 and valve 15a are then opened to permit flow of gas into the pipeline. Valve 21 is closed at this time. After the line has been purged by the gas for a suitable length of time, the gas is cut-off by closing valve 15a and when the line has returned to atmospheric pressure, the outlet end 11 of the pipeline section 10 is capped with a conventional end cover (not shown). After the end cover is coupled to the outlet end 11, the head 13 is disconnected and a pig 60 (FIG. 4) inserted in the end of the line. The cap on the outlet end of the line 11 serves the purpose of preventing air from entering the end of the pipeline while the head 13 is removed. The pig 60 may, for example, be a spool type arrangement with cup-like, rubber washers 60a at its ends, the washers being sized to the diameter of the pipeline. After the pig 60 is inserted into the pipeline, the head 13 is connected up to the pipeline again and the arrangement is as shown in FIG. 1, the pig 60 being shown in dashed lines. The end cap on the outlet end of the line is removed after the head 13 is coupled to the inlet of the pipeline or gas supply.

After the head 13 is connected to the gas supply, air is trapped in the head 13, the pot 30 and the various hose connections. In accordance with the present invention, outlet 57 is opened at this time, for example, by operation of valve 58. Valve 20, valve 21 and valve 23a are also opened. Hence, only the main valve 15a and sand feed valve 24a are closed at this time. Main valve 15a is then opened by a small increment only so that a very low pressure and amount of natural gas is supplied to manifold 17. The low pressure gas displaces any air from the system by flowing through the outlet 18, manifold 25 and outlets 26–29 to the head 13 and out of outlet 57 and also by flowing through the manifold 22, outlet 23 in the pot 30 and through the pipe openings 56 and pipes 41–43 to the head 13 and out of outlet 57. Since sand feed valve 24a is closed, no sand is fed into the system. The low pressure gas flow is, of course, inadequate to displace the pig 60 from the end of the line. After a suitable period of time, the apparatus is purged free of any substantial quantities of air in the apparatus which can be detected from the discharge through the head outlet 57. At this time, valve 15a and then valve 58 are closed. Then valve 21 to the pot 30 is closed and valve 15a opened to provide a high gas pressure and flow to drive the pig 60 through the line. The pig 60 serves to clear the line of any debris or fluid which may be in the line and also insures that there is no air present in the line. After the pig 60 is blown clear of the end of the pipeline 11, the valves 15a, 20, 21 are closed and the line 10 is permitted to return to atmospheric pressure. It should be appreciated that at this point and until the completion of the cleaning, removal of the head 13 is not necessary.

Preliminarily to the next step of the operation, the valves 23a, 24a are opened. Valve 15a and valve 21 are then opened to supply gas to the container 30 which feeds sand to the nozzle 13 and simultaneously therewith or shortly thereafter, valve 20 is opened to admit gas under pressure to the nozzle 13 to drive the sand through the pipeline. The gas pressure to the pot 30 via outlet 19 is maintained greater than the pressure of the gas supply to the nozzle 13 via outlet 18 to insure the feeding of the sand to the nozzle and into the line. A given charge or amount of sand suspended in gas at high velocities is admitted to the line during a short period of time as determined by the inlet pressures, the sand supply being cut off by operating valve 21 at the end of this time period and the gas drive is continued to propel the high velocity charge of sand admitted to line entirely through the pipeline 10. After the charge of sand is entirely through the line, the gas drive valve 20 is closed and the pipeline is once again permitted to return to an atmospheric pressure. As soon as the pipeline has returned to an atmospheric pressure, the sandblasting step may be repeated.

The number of sand blasting operations necessary depends upon the moisture in the line and the degree of cleaning desired. In general, the interior of the line cleans to bright surface, and subsequent operations may be conducted to further hone or polish the inside of the pipeline to a smooth finish. The progress of the entire cleaning operation may be roughly determined by an examination of the sand charge as it exhausts from the pipeline. For example, during the first sandblasting operation, the sand charge exhaust will invariably be noted as extremely cloudy and dirty. As each blast is performed it will be noted that the particulate material in the exhaust becomes lighter and lighter in color as more and more cleaning is accomplished. The cleaning may be adjudged finished when the sand comes out in substantially the same color as it was applied in the input. At this time the interior of the pipeline will also be bright with a polished smooth interior surface.

At the end of the cleaning operation, to remove any remnant sand or dust which may have been dropped out in joints or along the length of the line, the head 13 can be disconnected and a cleaning pig 62 as shown in FIG. 5, may be inserted into the inlet 12 of the pipeline section 10 in a manner similar to the insertion of pig 60. Pig 62 contains fine wires arranged to brush the interior of the pipeline. The apparatus is then purged as with the pig 60 to expurgate air from the system. Following the air expurgation, pig 62 is driven through the line by a gas drive.

While a particular embodiment of the present invention has been shown and described, it is apparent that changes and modifications may be made without departing from this invention in its broader aspects and, therefore, the aim in the appended claim is to cover all such changes and modifications as fall within the true spirit and scope of this invention.

What is claimed is:

A method for use prior to the cleaning of a pipeline by means of a mixture of abrasive material and inflammable gas comprising the steps of: inserting a pig into the inlet of a pipeline; coupling sand injection apparatus between the inlet of the pipeline and an inflammable gas supply means, opening the injection apparatus to the atmosphere at a point adjacent to the inlet end of the pipeline; providing a low pressure gas flow from the gas supply means to the injection apparatus to expurgate air in the region between the gas supply means and injection apparatus without dislodging the pig from the inlet of the pipeline, closing off the injection apparatus from the atmosphere at the point adjacent to the inlet end of the pipeline, and providing a gas flow adequate to drive the pig through the pipeline.

References Cited in the file of this patent

UNITED STATES PATENTS

| | | |
|---|---|---|
| 1,557,131 | Armstrong | Oct. 13, 1925 |
| 1,590,816 | Ericsson | June 29, 1926 |
| 2,087,694 | Malmros | July 20, 1934 |
| 2,518,047 | Morel | Aug. 8, 1950 |
| 2,627,149 | MacCraken | Feb. 3, 1953 |
| 2,745,231 | Prince | May 15, 1956 |
| 2,826,006 | Croft | Mar. 11, 1958 |